United States Patent
Suzuki et al.

(10) Patent No.: US 7,415,453 B2
(45) Date of Patent: Aug. 19, 2008

(54) SYSTEM, METHOD AND PROGRAM PRODUCT FOR FORECASTING THE DEMAND ON COMPUTER RESOURCES

(75) Inventors: Yasuhiro Suzuki, Machida (JP);
Katsuyoshi Yamamoto, Machida (JP);
Naoya Yamamoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/174,981

(22) Filed: Jul. 5, 2005

(65) Prior Publication Data

US 2006/0010101 A1 Jan. 12, 2006

(30) Foreign Application Priority Data

Jul. 8, 2004 (JP) .............................. 2004-202032

(51) Int. Cl.
*G06F 17/30* (2006.01)
*G06F 15/173* (2006.01)

(52) U.S. Cl. ............................. 707/2; 707/10; 709/224; 709/226

(58) Field of Classification Search ...................... 707/2
See application file for complete search history.

(56) References Cited

U.S. PATENT DOCUMENTS

| | | | | |
|---|---|---|---|---|
| 2002/0181419 A1* | 12/2002 | Zhang et al. | ................. | 370/331 |
| 2003/0060692 A1* | 3/2003 | Ruchti et al. | ................. | 600/310 |
| 2003/0225563 A1* | 12/2003 | Gonos | ......................... | 703/22 |
| 2004/0158613 A1* | 8/2004 | Sommerer | ................... | 709/206 |
| 2005/0132051 A1* | 6/2005 | Hill et al. | ..................... | 709/226 |
| 2006/0161884 A1* | 7/2006 | Lubrecht et al. | ............ | 717/104 |

FOREIGN PATENT DOCUMENTS

| | | |
|---|---|---|
| JP | 2001-109638 | 4/2001 |
| JP | 2002-505457 | 2/2002 |
| JP | 2002-268922 | 9/2002 |
| JP | 2002-278945 | 9/2002 |
| JP | 2003-58518 | 2/2003 |
| JP | 2003-178909 | 6/2003 |

OTHER PUBLICATIONS http://www.microsoft.com/japan/msdn/net/bda/bdadotnetarch081.asp/.
http://www-6.ibm.com.jp/autonomic/pdf/acwp_j.pdf/.

* cited by examiner

*Primary Examiner*—Pierre Vital
*Assistant Examiner*—Truong V Vo
(74) *Attorney, Agent, or Firm*—Mark S. Walker; Suiter Swantz pc llo

(57) ABSTRACT

An automated system and method for predicting a future resource utilization tendency by analyzing a change in resource usage on the basis of a real operation condition in a computer system. A CPU utilization estimating unit acquires a resource log and a transaction log, and estimates utilization for each transaction, and information on the number of executions for each transaction, a processing amount predicting unit performs a statistical time-series analysis on the basis of time-series data of the number of executions for each transaction included in the transaction log and predicts an amount of processing for each type of a transaction, and a resource utilization predicting unit predicts the computer resource utilization or demand on from the estimated resource utilization for each transaction and the future predicted amount of processing for each transaction.

3 Claims, 6 Drawing Sheets

FIG. 6

SYSTEM, METHOD AND PROGRAM PRODUCT FOR FORECASTING THE DEMAND ON COMPUTER RESOURCES

TECHNICAL FIELD

The present invention relates to a system and a method for predicting a future tendency by analyzing a transition of a capacity of a computer resource for a system configuration or updating of settings.

BACKGROUND ART

In a computer system, a computer resource (hereinafter referred to just as a resource) such as processing capability of a CPU and storage capacity of a storage device preferably has a capacity appropriate for a system transaction. Accordingly, in a computer that can offer various services via a network, it is necessary to prepare an appropriate capacity according to the access amount or the change in access frequency.

Conventionally, as a method of adjusting the capacity of a computer system resource, for example, there was provided the method wherein, monitoring a real operating condition of the system, a person predicts when and which resources lack the capacity and adds required resources.

In addition, the configuration and setting of software and hardware in the server (sizing) required for satisfying the needs of the application was tested in a test environment before operation of the system by measuring the system load for each type of transaction according to an application and estimating the necessary capacity (capacity planning) (for example, See: "Tool for Capacity Planning", [online], 6 Jun. 2003, Microsoft [searched in 28 Apr. 2004], <URL: http://www.microsoft.com/japan/msdn/net/bda/bdadotnetarch081.asp>). In this method, as a parameter in the test, a person estimated and inputted the number of processing transactions expected duringreal operation of the system.

Furthermore, in recent years, research has been performed on autonomic computing that endows a computer with features of "configuring", "restoring", "optimizing", and "protecting" itself to make it autonomously work (for example, See: "Blueprint Relating to Autonomic Computing Architecture", [online], April 2003, IBM Japan, [searched in 22 Aug. 2003], <URL: http://www-6.ibm.com/jp/autonomic/pdf/acwp-j.pdf>).

The capacity of the system can be adjusted using this technique. That is to say, having an additional resource ready in advance, this technique makes a computer itself to supplement the resource lacking in the real operation, using this additional resource.

PROBLEMS TO BE SOLVED BY THE INVENTION

As stated above, the computer system resource preferably has a capacity appropriate for a system transaction. Particularly, if the transaction parameters change, it is necessary to adjust the capacity dynamically so as to be appropriate for the transaction.

The method of having a person monitor a real operating condition of the system and predict when and which resource lacks the capacity and then adds a required resource to adjust the system capacity, is often inadequate because, the accuracy of the prediction significantly depends upon the experience or a skill of the person. Furthermore, it has been hard to estimate to what extent resources should be increased to respond to predicted future changes of the transaction parameters.

Conventionally, sizing the configuration or setting of a server by estimating the necessary capacity is carried out before production operation of a system. Sizing measures the system's load in a special test operating environment. Therefore, this approach to sizing is not appropriate for dynamically responding to transaction change in real operation. Also, parameters such as the number of transactions processed and the like inputted at the time of testing are predicted by a person solely on the basis of that person's experience. Therefore, this may fail to predict the actual transaction volume at the time of real operation.

Furthermore, the capacity adjusting method using an autonomic computer that can put in backup resources on the basis of short-term predictions after resources actually become deficient also has limitations. A person determined how many backup resources should be prepared in advance, based on a long-term perspective. For this reason, it is necessary to rely on each person's experience and skill in determining the type and amount of resources to prepare in advance. Therefore, it is difficult to prepare the optimal amount of backup resources.

It is an object of the present invention to provide a system and a method of predicting a future resource requirement by analyzing a change in utilization of a resource based on a real operating condition of a computer system.

It is another object of the present invention to provide a system and a method of mechanically determining when and what resources are currently or are predicted to be insufficient on the basis of the above prediction and further deciding how many backup resources should be prepared in advance.

SUMMARY OF THE INVENTION

To achieve the above object, the present invention is provided as a system for predicting a change of a capacity requirement of a computer resource. Particularly, the present invention focuses on a transaction type. The system comprises: a resource utilization estimating unit for acquiring a resource-use log (first log) and a transaction log (second log) from a computer and estimating resource utilization for each transaction on the basis of information on the resource utilization (including resource data such as CPU utilization, memory usage, a storage capacity of a storage device, and a network usage, here) of the entire computer included in these logs and information on the number of processes for each transaction; and a processing amount predicting unit for acquiring the transaction log from the computer, performing a statistical time-series analysis on the basis of time-series data of the number of processes for each transaction included in the log, and predicting a future amount of processing for each transaction type (by using a time-series model identified by the analysis); and a resource utilization predicting unit for predicting the computer resource utilization in the future on the basis of the estimated resource utilization for each transaction and the future predicted amount of processing for each transaction.

In more detail, the resource utilization estimating unit obtains resource utilization at a plurality of times and the amount of processing for each transaction at the corresponding time from each log and estimates the resource utilization for each transaction by a multiple linear regression analysis.

Also, the processing amount predicting unit excludes the last data during a certain period in a time-series data and identifies the time-series model on the basis of the remaining data. And, the processing number predicting unit predicts the number of processing transactions corresponding to the previously excluded part of the time-series data by the identified time-series model, and compares the predicted result with actual data of the excluded part to verify the time-series model.

Furthermore, the present invention is provided as a system for performing server sizing by inputting the expected CPU utilization for each transaction and future predicted amount of processing acquired from the CPU utilization estimating unit and the processing amount predicting unit, as parameters, or provided as a monitor system for performing monitor control when the server operating condition and environment are monitored.

Also, to achieve the above-mentioned objects, the present invention is also provided as the following server control method by a computer. This server control method includes a step of the computer acquiring a transaction log from the server, a step of the computer identifying the time-series model by performing a statistical time-series analysis on the basis of the time-series data of the number of processing resources for each transaction included in the acquired transaction log, and a step for predicting the amount of processing resources for each type of transaction using the identified time-series model.

And, more preferably, a computer further includes: a step of estimating the resource utilization of each transaction on the basis of information on resource utilization of the entire server included in the log related to the acquired resource utilization and information on the number of processing resources for each transaction included in the transaction log; additionally, a further step of predicting a change in server resource utilization in the future on the basis of the estimated resource utilization for each transaction and the predicted amount of processing resource for each transaction in the future. This step of predicting may also be a server sizing step for deciding the configuration and/or setting of software and/or hardware in the server on the basis of estimated resource utilization for each transaction and the future predicted amount of the processing resource for each transaction or a server monitoring step for controlling monitor operation of the server.

Furthermore, the present invention may be provided as a program for realizing each function of the above-mentioned system by controlling the computer or may be provided as a program for performing processing responding to each step of the above-mentioned control method in a computer.

According to the present invention comprised as above, a future tendency can be predicted by analyzing the utilization condition of a computer resource by time-series processing on the basis of the real operating condition of the computer system.

And, it becomes possible to automatically determine when and what resources are lacking on the basis of this prediction, and to further decide how many backup resources should be prepared in advance.

PREFERRED EMBODIMENT OF THE INVENTION

Below, the best mode for carrying out the present invention (hereinafter referred to as an embodiment) will be explained in detail with reference to the attached drawings.

The present embodiment analyzes the transaction log in the real operation of the computer system, analyzes a change in the resource utilization condition in the system, and predicts when and which resources are lacking (prediction of capacity), which enables the resources to be increased appropriately. The capacity shortfall or demand prediction in the present embodiment can appropriately be applied to various resources such as CPU utilization, memory usage, a storage capacity of a storage device, and a network usage etc. The following explanation uses capacity prediction of CPU utilization as an example. The invention described herein may be applied to the prediction of other resource requirements, such as, memory and persistent storage.

Figure 1:
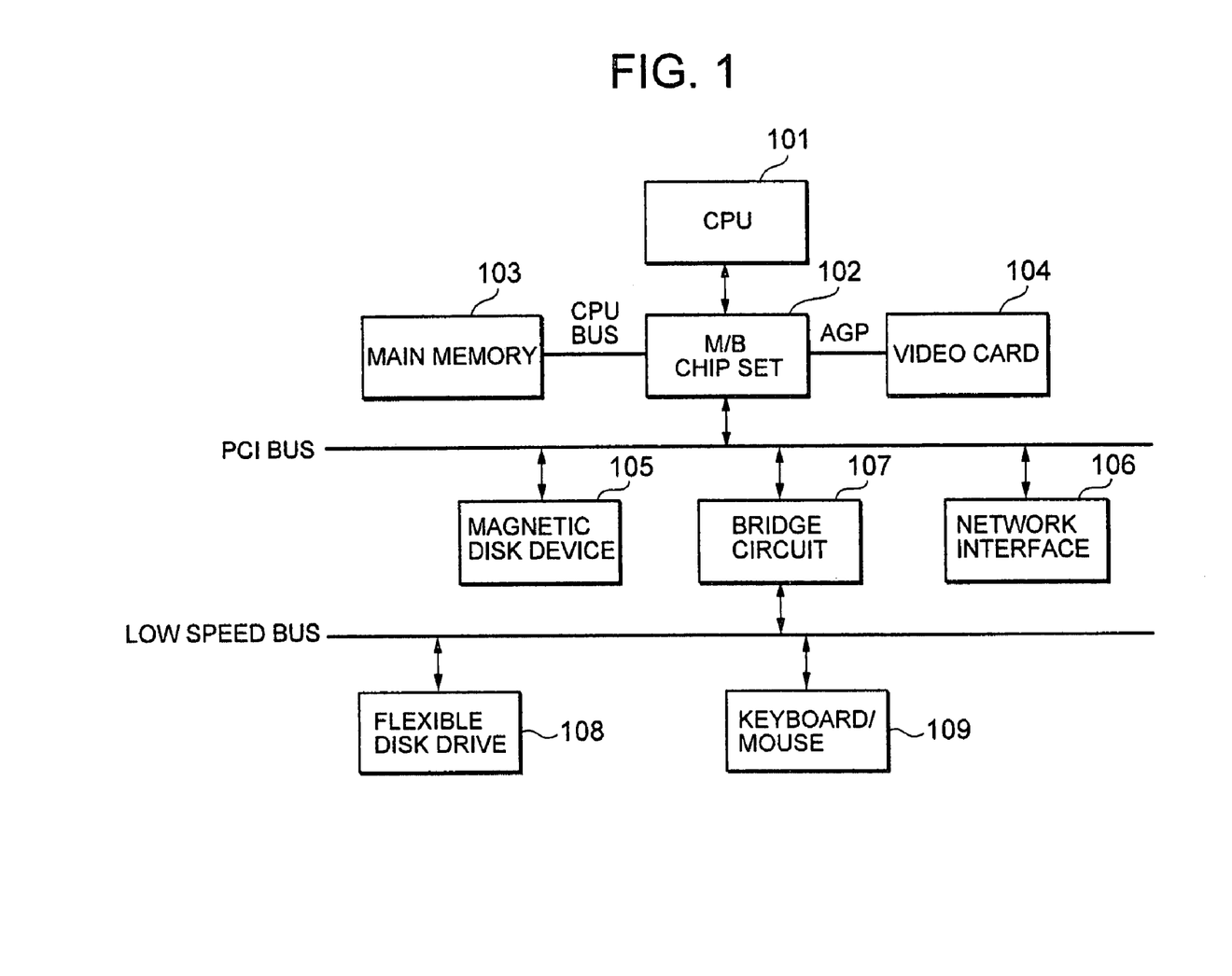
FIG. 1 is a drawing schematically showing an example of a hardware configuration of a computer device suitable for carrying out a capacity predicting system in the present embodiment.

FIG. 1 is a drawing schematically showing an example of a hardware configuration of a computer device suitable for realizing a capacity consumption or demand prediction system in the present embodiment.

The computer device shown in FIG. 1 is provided with:

a CPU (Central Processing Unit) 101 which is an operation means;

a main memory 103 connected to the CPU 101 via a M/B (motherboard) chip set 102 and a CPU bus;

a video card 104 connected to the CPU 101 likely via the M/B chip set 102 and an AGP (Accelerated Graphics Port);

a magnetic disk device (HDD) 105 connected to the M/B chip set 102 via a PCI (Peripheral Component Interconnect) bus;

a network interface 106; and furthermore, a flexible disk drive 108 and keyboard/mouse 109 connected to the M/B chip 102 set via a bridge circuit 107 from this PCI and low speed bus such as ISA (Industry Standard Architecture) bus.

FIG. 1 only shows an example of a hardware configuration of the computer device to realize the present embodiment. Other various computer configurations can be used without departing from the spirit of the invention. For example, it is possible to configure a hardware so as to process an image data in CPU 101 by loading a video memory in place of a separate video card 104, and also possible to furnish a drive for a CD-R (Compare Disk Recordable) or a drive for DVD-RAM (Digital Versatile Disc Random Access Memory) via an interface such as an ATA (AT Attachment) or a SCSI (Small Computer System Interface) as an external storage device.

Figure 2:
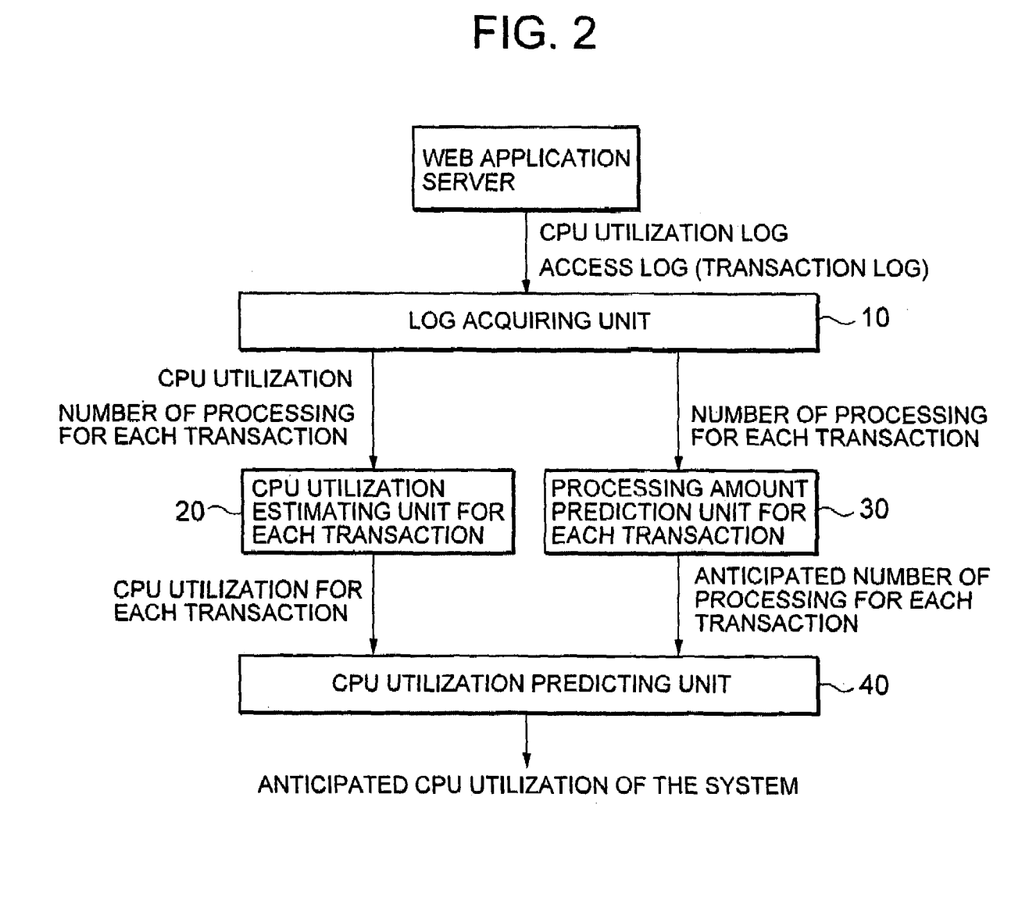
FIG. 2 is a drawing showing a functional configuration of the capacity predicting system according to the present embodiment.

FIG. 2 is a drawing showing a functional configuration of the capacity predicting system according to the present embodiment. In the present embodiment, an web application server may be identified as the computer system targeted for capacity predicting. A transaction in a web application server has the following characteristics.

Processing of an access request from a client makes up the majority of the processing in the system.

The load on the server for each type of transaction is approximately constant.

The proportion of the number of each type of transaction (transaction mix) changes dynamically.

The types of transactions can be increased and decreased by modification of the application.

Also, as mentioned above, in the present embodiment, the resource for performing capacity prediction is applied to CPU utilization. That is to say, in the capacity prediction system shown in FIG. 2, CPU utilization and the future predicted amount of processing are obtained for each transaction by analyzing the transaction log obtained from the web application server, and future CPU utilization can be predicted on the basis of these parameters.

As shown in FIG. 2, the capacity prediction system in the present embodiment is provided with:

a log acquiring unit 10 for acquiring a log from the web application server, which is the target of capacity prediction;

a CPU utilization estimating unit 20 for estimating CPU utilization for each transaction on the basis of the acquired log;

a processing amount predicting unit 30 for predicting the future amount of processing for each transaction; and a CPU utilization predicting unit 40 for predicting future CPU utilization of this web application server on the basis of the processing results of the CPU utilization estimation unit 20 and the processing amount prediction unit 30. The computer system shown in FIG. 1 in the present embodiment is used to implement, these configurations using the program controlled CPU 101, and a storage device such as a main memory 103 or a magnetic disk storage 105. Also, if the log is acquired from the web application server via a network, the function of the log acquisition unit 10 is realized by a network interface 106 in addition to the CPU 101 and a storage device.

The log acquiring unit 10 acquires the CPU utilization log and the transaction log from the web application server which is the target of the capacity prediction, and then stores them in a storage means such as the main memory 103, hard disk drive 105, or the cache memory of the CPU 101 shown in FIG. 1. These acquired logs are transferred to the CPU utilization estimation unit 20. Also, the transaction log is transferred to the processing amount predicting unit 30. CPU utilization is periodically measured by the monitoring structure of the system itself and the measured time are recorded in the CPU utilization log. In the transaction log, the performance time and the transaction ID which characterizes the performed transaction are recorded for each transaction performed by the system. These logs contain information generally acquired during regular operation of a normal computer system. Therefore, this information can be acquired from an existing computer system without creating a special function for the present embodiment. Now, in the present embodiment, as explained above, the majority of processing in a web application server is the processing of access from clients. Therefore, an access log may be acquired as the transaction log. The following explanation is based on the log acquiring unit 10 acquiring an access log from the web application server.

The CPU utilization estimating unit 20 acquires a CPU utilization log and an access log from the log acquiring unit 10, and estimates the CPU utilization on the basis of the information of CPU utilization and the number of each transaction processed which is included in these logs.

Figure 3:
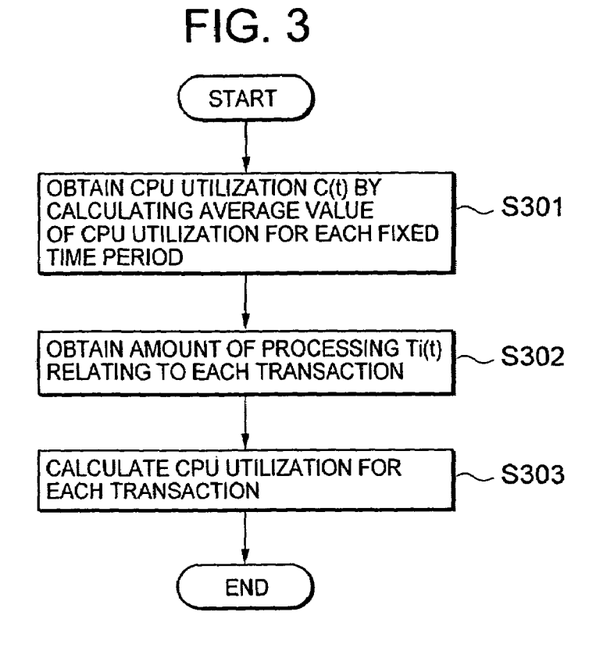
FIG. 3 is a flowchart explaining processing by a CPU utilization estimating unit in the present embodiment.

FIG. 3 is a flowchart explaining processing by a CPU utilization estimating unit in the present embodiment.

As shown in FIG. 3, the CPU utilization estimating section 20 firstly calculates the average value of CPU utilization for each fixed period of time (for example, every 1 hour) from the log of acquired CPU utilization, and this obtained value is considered to be CPU utilization C(t) by all the transactions in each time t (the time within the fixed period of time concerned) (step 301). The obtained CPU utilization C(t) is stored in the main memory 103 or the cache of the CPU 101, which are shown in FIG. 1.

Also, the CPU utilization estimating section 20 counts the number of transactions processed for each fixed time period (for example every 1 hour) for each transaction ID from the acquired access log. For each transaction (transaction $ID_i$), the amount of processing $T_i(t)$ in each time t (the time within the fixed period of time concerned) is obtained (step 302). The obtained amount of processing $T_i(t)$ is stored in the main memory 103 or the cache memory of the CPU 101, which are shown in FIG. 1.

The step of obtaining this CPU utilization C(t) and the step of obtaining the amount of processing $T_i(t)$ for each transaction are independent processes. Any of these processes may be performed first or they may be performed in parallel.

Next, the CPU utilization estimating unit 20 calculates the CPU utilization for each transaction on the basis of the CPU utilization C(t) obtained in step 301 and the amount of processing $T_i(t)$ for each transaction obtained in step 302 (step 303).

The method of calculating this CPU utilization for each transaction will be specifically explained.

Firstly, with respect to the CPU utilization of time t, the following formula is postulated.

$$C'(t) = \alpha_1 T_1(t) + \alpha_2 T_2(t) + \ldots + \alpha_n T_n(t) + \alpha_0 \quad \text{(Formula 1)}$$

In the above-mentioned formula 1, $\alpha_i$ (i=1 to n) represents the CPU utilization required for processing one transaction of a transaction $ID_i$ (hereinafter, simply referred to as $ID_i$), $T_1(t)$ represents the number of processing transactions for $ID_i$ in time t, and $\alpha_0$ represents the CPU load not represented by a transaction, respectively. Now, it is assumed that $\alpha_0$ is a fixed value or sufficiently small compared to the CPU load $\alpha_1 T_1(t) + \alpha_2 T_2(t) + \ldots + \alpha_n T_n(t)$ represented by the transaction.

The CPU utilization estimating unit 20 generates a plurality of formulae 1 wherein specific values are substituted for $T_i(t)$, using C(t) and $T_i(t)$ for different times t obtained in steps 301 and 302. Next, the CPU utilization estimating unit 20 performs multiple linear regression analysis using the plurality of generated formulae 1, and obtains $\alpha_0, \alpha_1, \alpha_2 \ldots \alpha_n$ which make $\Sigma(C(T)-C'(t))$ the smallest. At this time, for example, by applying a variable increase and decrease method with the regression value $f_{in} = f_{out} = 2$, the CPU utilization estimating unit 20 can delete variables with a low contributing rate, and can add variables with a high contributing rate. Also, the unit can perform an operation of excluding multicollinearity. Furthermore, if a computer system (in the present embodiment, the web application server) being targeted for the capacity prediction is the system (application) wherein batch processing becomes the main processing in a fixed time period such as nighttime, it is possible to improve the precision of estimation by narrowing the time period of the log used in estimation. In addition, if the given transaction $T_i$ is not performed at all, for the CPU utilization $\alpha_i$ required for processing this transaction is deemed to be $\alpha_i = 0$. The CPU utilization obtained as above for each type of transaction is stored in the main memory 103 or the cache memory of the CPU 101 which are shown in FIG. 1.

The processing amount predicting unit 30 acquires an access log from the log acquiring unit 10 and estimates the future amount of processing for each fixed period of time for each type of transaction on the basis of the information on the number of processing for each transition, which is included in this log.

Figure 4:
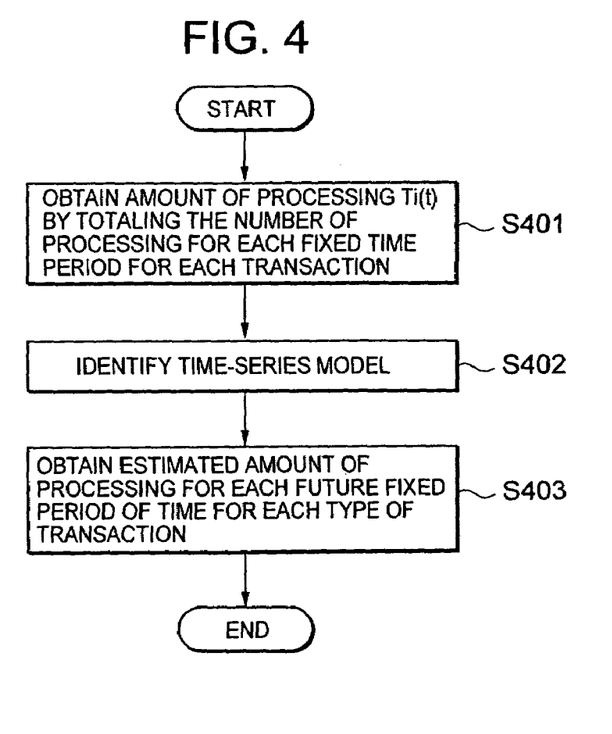
FIG. 4 is a flowchart explaining processing by a processing amount predicting unit in the present embodiment.

FIG. 4 is a flowchart explaining processing performed by a processing amount predicting unit 30 in the present embodiment.

As shown in FIG. 4, first the processing amount predicting unit 30 counts the number of transactions processed for each fixed period of time (for example, every 1 hour) for each transaction ID from the acquired transaction log. And, with respect to each transaction (transaction $ID_i$), the amount of processing $T_i(t)$ for each time t (the time within the fixed period of time concerned) is obtained (step 401).

Next, the processing amount predicting unit 30 identifies a time-series model using a statistical time-series analysis technique (step 402), and obtains the future estimated amount of processing for each fixed amount of time for each type of transaction, using this time-series model (step 403).

The identification of this time-series model and the process of obtaining the estimated amount of processing will be explained in detail. The ARIMA (Auto Regressive Integrated Moving Average) model is used as the time-series model in the present embodiment.

Figure 5:
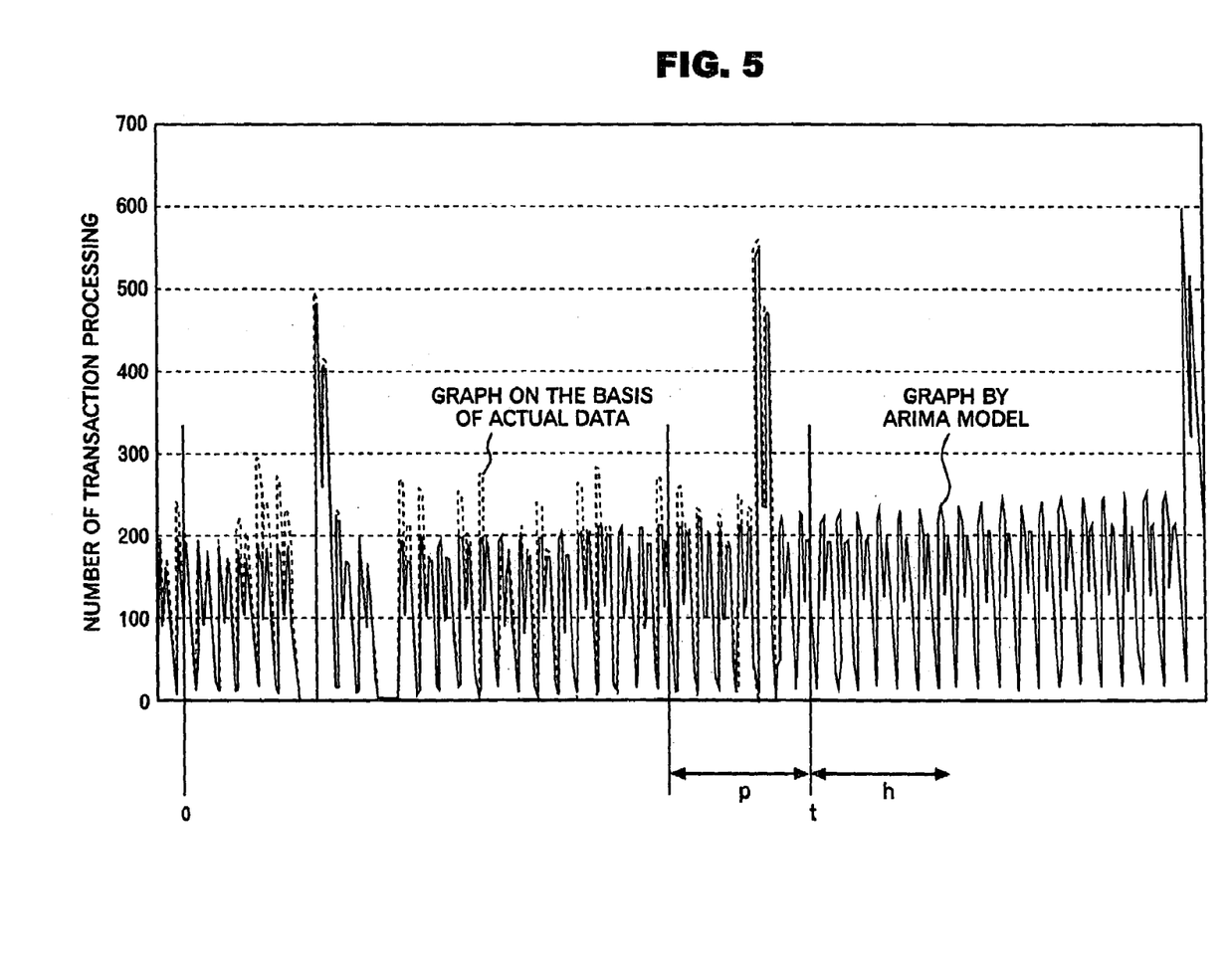
FIG. 5 is a drawing explaining a method of predicting a processing amount by the processing amount predicting unit in the present embodiment.

FIG. 5 is a drawing used in explaining the method of predicting a processing amount by the processing amount predicting unit 30 in the present embodiment.

In FIG. 5, the graph on the basis of time-series data for the actual processing amount is shown by a light thick line and the graph by the ARIMA model (including the predicted part) is shown by a dark thin line.

Firstly, the processing amount predicting unit 30 identifies the ARIMA model by the Box-Jenkins approach from the time-series data of the amounts of processing $T_i(0)$ to $T_i(t-p-q)$ obtained in step 401. At this time, while changing the value of q in the time-series data from 0 to t-p, the unit 30 identifies a plurality of ARIMA models. Here, p is the parameter for excluding the data used in the after mentioned results verification and an arbitrary time period is set. Identification of the ARIMA model is performed for each transaction ID.

Next, the processing amount predicting unit 30 predicts the amounts of processing $T'_i(t-p)$ to $T'_i(t)$. As mentioned above, a plurality of ARIMA models exist for each transaction ID. Therefore, prediction results are obtained for each of these ARIMA models. And, the unit 30 compares the predicted results obtained by each ARIMA model with the actual amounts of processing $T_i(t-p)$ to $T_i(t)$ obtained from the access log to select the model having the smallest error in performing prediction and thereby obtains the future estimated amount of processing $T'_i(t+h)$ according to the chosen model.

In the present embodiment, as mentioned above, all of the processing amount data obtained from the access log is not used to identify the time-series model (ARIMA model), but a part is used for verification of the predicted result according to the time-series model. This operation will be further explained.

When the time-series model is identified, the tendency of the obtained model differs according to the transition condition of the value adjacent to the last (newest) data in the time-series data. Accordingly, when a time-series model is identified using all of the processing amount data obtained from the access log, that model may be affected in the transition condition of the value adjacent to the newest data $T_i(t)$.

As mentioned above, in the present embodiment, while a part (a fixed time period part) is excluded in advance from the time-series data of the processing amount of the transaction, the time-series model is identified using the remaining time-series data. And, it is determined to predict the amount of processing corresponding to the excluded part according to the obtained model and verify the reliability of this model by comparing the predicted result with the actual processing amount data excluded in advance.

Specifically, when the time-series data of processing amounts for several 10 days to several months are described in the access log, for example, the data from the newest data to the data of 1 week (7 days) will be used for verification. That is to say, in the above-mentioned amount of processing $T_i(t-p-q)$, p=7. And, by optionally changing q by 1 day, a plurality of ARIMA models is identified. If q=0, all of the remaining data wherein the data of 7 days has been excluded from the time-series data of the access log are used to identify the ARIMA model. If q=1, the ARIMA model is identified by the data wherein the data of the last 1 day is further excluded from the remaining data wherein the data of 7 days has been excluded. For the plurality of models obtained in this way, the amount of processing corresponding to the data of 7 days excluded for verification is predicted respectively, and the predicted results are compared with the actual data of 7 days. Herewith, the ARIMA model having the smallest error in performing prediction may be deemed to be a model with high reliability.

The CPU utilization predicting unit 40 substitutes the CPU utilization for each transaction estimated by the CPU utilization estimating unit 20 and the future estimated amount of processing $T'_i(t+h)$ for each transaction predicted by the processing amount predicting unit 30 for the above-mentioned formula 1, and predicts the CPU utilization C'(t+h) in the entire system at the time t+h. The future transition of the CPU utilization in the web utilization server, which is targeted for the capacity prediction can be predicted by optionally setting the h of the time t+h to predict the CPU utilization C'(t+h) and thereby, it is possible to predict about when the processing ability (CPU resource) of this web application server will lack.

As mentioned above, in the present embodiment, the CPU utilization is used as the example resource for performing the capacity prediction functions that have been explained specifically and in detail. However, the present invention is not limited to the prediction of CPU utilization only. It goes without saying that it is applicable for various types of resources such as memory utilization, storage capacity of a storage device, and network utilization.

For example, when it is applied to memory utilization, a function for estimating memory utilization for each transaction and a function for predicting future memory utilization in the entire system may be provided in the system configuration shown in FIG. 2, as substitutes for the CPU utilization estimating unit 20 and the CPU utilization predicting unit 40. And, memory utilization is estimated for each transaction by a process using a multiple linear regression analysis similar to the analysis performed by CPU utilization estimating unit 20 with respect to CPU utilization, and a future transition of memory utilization in the system is estimated on the basis of this estimated result and the prediction result of the processing amount predicting unit 30.

As just described, the present embodiment can be applicable to various types of resources as it is, and it is possible to predict when and what resources will be insufficient by analyzing the change in the utilization condition of each resource.

In the present embodiment, in order to perform prediction of the amount of processing, the ARIMA model was used as the time-series model showing a tendency of a transition of a processing amount. However, other appropriate models may be identified by using moving averages and applying the time-series data of the processing amount to a regression line or a regression curve. Basically, any model can be used as long as that model is a time-series model enabling to predict $Z_{t+1}, Z_{t+2}, \ldots, Z_{t+n}$, based on the time-series data of one variable such as $Z_1, Z_2, \ldots, Z_t$.

Now, as mentioned above, the capacity prediction system shown in FIG. 2 is provided with a CPU utilization predicting unit 40 and the final future CPU utilization in the system is predicted. However, other than predicting the future CPU utilization, it is possible to perform various types of server control on the basis of the CPU utilization for each transaction estimated by the CPU utilization estimating unit 20 and the future estimated amount of processing $T'_i(t+h)$ for each transaction predicted by the processing amount predicting unit 30. Below, an example of such is explained.

Figure 6:
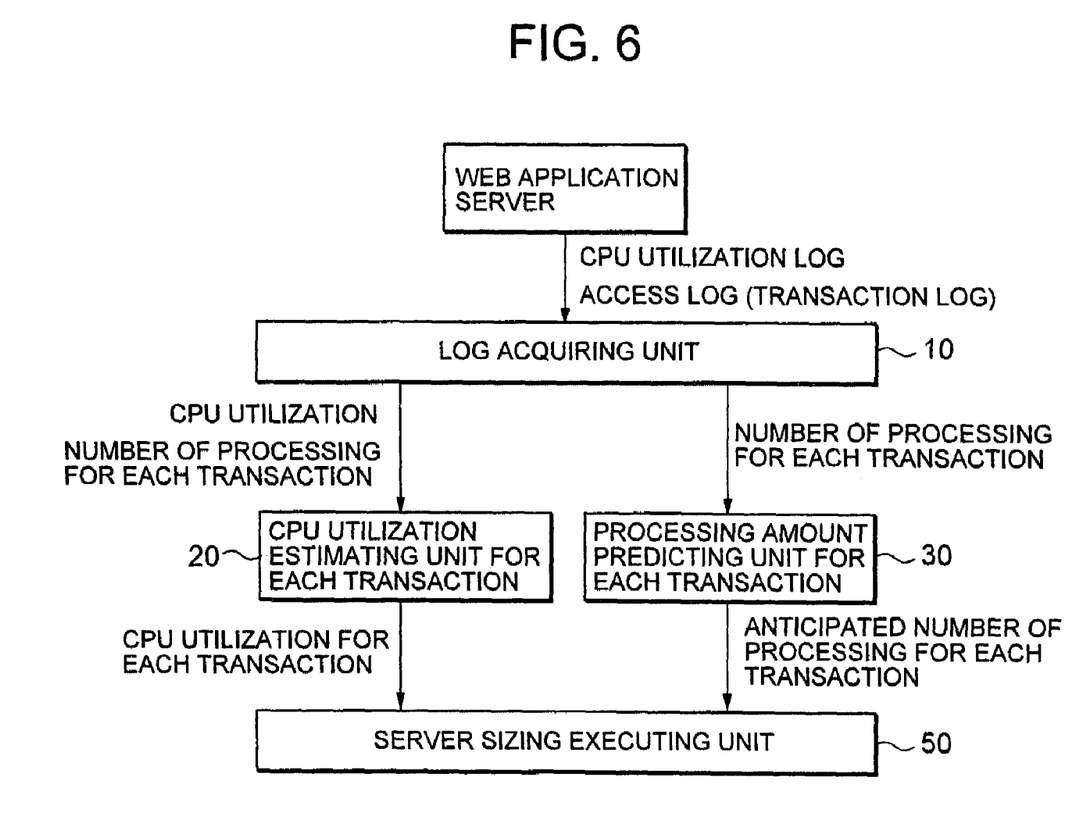
FIG. 6 is a diagram showing a configuration example applied to a server sizing system in the present embodiment.

FIG. 6 is a diagram showing a case of the preferred configuration applied to a server sizing system according to the present embodiment.

The system shown in FIG. 6 is provided with the log acquiring unit 10, the CPU utilization estimating unit 20, the processing amount predicting unit 30, and a server sizing executing unit 50 for executing server sizing on the basis of the processing results of the CPU utilization estimating unit 20 and the processing amount predicting unit 30. When these configurations are realized in the computer system of the present embodiment in FIG. 1, a program controlled CPU 101 and a storage device such as a main memory 103 or a magnetic disk device 105 and the like are employed. Also, if a log is acquired from the web application server via the network, the function of the log acquiring unit is implemented by a network interface 106 in addition to the main memory 103 and the storage device. The functions of the log acquiring unit 10, the CPU utilization estimating unit 20, and the processing amount predicting unit 30 are the same as the function block shown in FIG. 2 corresponding to the capacity predicting system. Therefore, the same reference codes have been attached to omit the explanation.

The server sizing executing unit 50 inputs the CPU utilization and future estimated amount of processing for each transaction acquired from the CPU utilization estimating unit 20 and the processing amount predicting unit 30 as parameters, and decides the configuration and setting of software and hardware required for sufficiently satisfying the application needs in the server on the basis of the type of transaction, the time characteristics in the change of the amount of processing and the like.

Now, the process itself in the server sizing executing unit 50 is the same as an existing sizing tool used for deciding the size or configuration of a system at the time of setting this system and the like. That is to say, according to the present embodiment, server sizing normally performed on the basis of parameters predicted by a person in a test environment in the system is performed using information obtained from the CPU utilization estimating unit 20 and the processing amount predicting unit 30 as the parameters. This enables to plan updating and the like of the configuration and setting of the system can be planned on the basis of real data at the time of real operation, not in the test environment.

Figure 7:
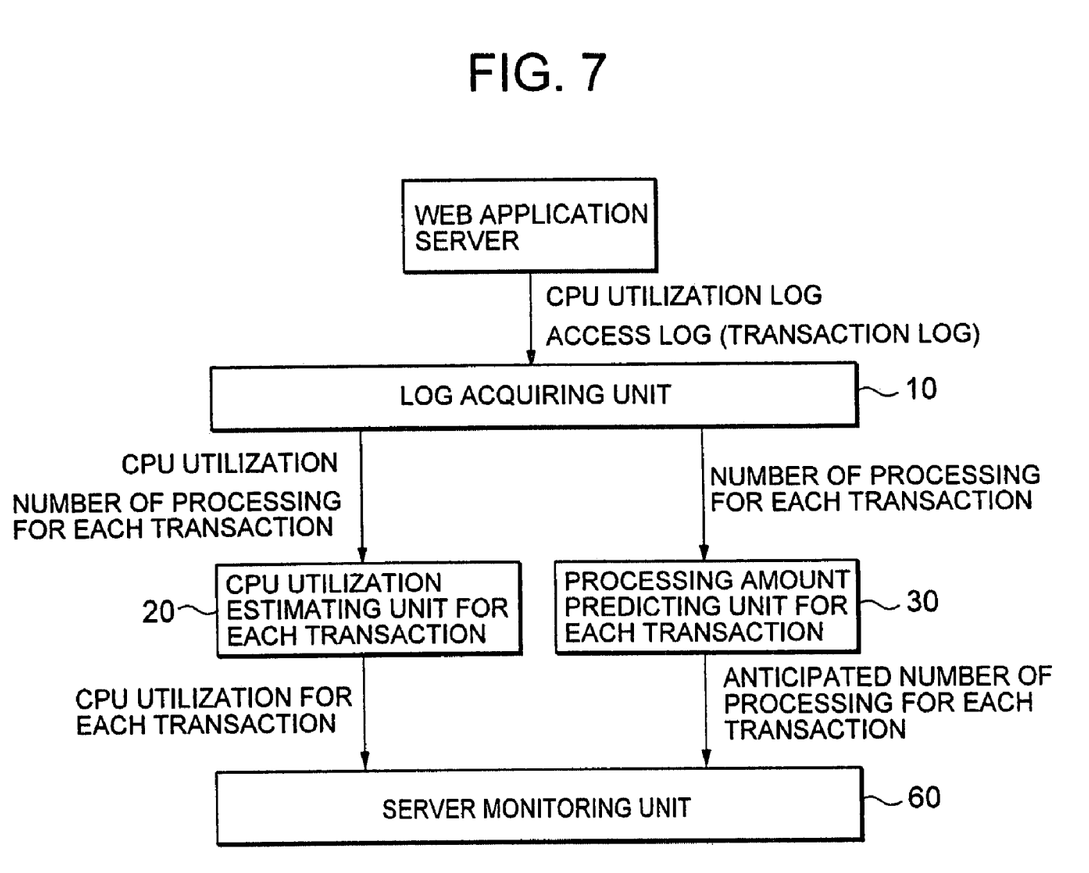
FIG. 7 is a diagram showing a configuration example applied to a server monitoring system in the present embodiment.

FIG. 7 is a diagram showing a case of a configuration in applying the present embodiment to the server monitoring system.

The system shown in FIG. 7 is provided with the log acquiring unit 10, the CPU utilization estimating unit 20, the processing amount predicting unit 30, and a server monitoring unit 60 for monitoring the changing condition and environment of the web application server. If the system of the present embodiment is realized in the computer system shown in FIG. 1, these constitutions are realized with the program controlled CPU 101 and a storage device such as the main memory 103 or the magnetic disk device 105. Also, if a log is acquired from the web application server via the network, the function of the log acquiring unit 10 is realized by the main memory 103 and the storage device as well as the network interface 106. The functions of the log acquisition unit 10, the CPU utilization estimating unit 20, and the processing amount predicting unit 30 are the same as the function block shown in FIG. 2 corresponding to the capacity predicting system. Therefore, the same reference codes are attached to omit the explanation.

The server monitoring unit 60 monitors the changing condition and environment of the web application server, and thereby determines the CPU utilization, utilization tendency and the like, and gives a warning, if required. The server monitoring unit 60 in the present embodiment considers the CPU utilization and future estimated amount of processing for each transaction acquired from the CPU utilization estimating unit 20 and the processing amount predicting unit 30 in order to control this monitoring movement and perform determination in monitoring items.

For example, if there is provided a setting that a warning is given when the CPU utilization becomes above a certain amount, the future CPU utilization is predicted from the CPU utilization and future estimated amount of processing for each transaction. And, it is possible to decide a threshold value of the CPU utilization for determining whether or not a warning should be given on the basis of the tendency of a change in the predicted CPU utilization.

Also, there is provided a setting that the warning should be given if the CPU utilization reaches 80%. And the CPU utilization is expected to reach 80% at a point. In this case, it is possible to perform such control of the monitoring movement that a warning should be given if the CPU utilization is expected to further increase, and a warning should not be given if the CPU utilization does not continue to increase as it is but merely momentarily reaches 80%, in consideration of the predicted result of the CPU utilization.

The server sizing system shown in FIG. 6 and the server monitoring system shown in FIG. 7 perform server sizing and monitoring control on the basis of the changes in the CPU utilization. However, it goes without saying that these systems, as mentioned above, can perform the server sizing and monitoring control on the basis of the change in the utilization condition of various resources such as a memory utilization, storage capacity of a storage device and network utilization.

Furthermore, the above-mentioned explanations are of systems for performing capacity predicting, server sizing, and monitoring of a web application server as targeting a web application server, however, the present embodiment is not limited to analysis of a web application server. If a majority of processing (processing using a resource) performed in a server is performed according to a request from a client, and the load (the utilization and utilized amount of the resource) is approximately fixed and stable over the long-term depending on the type of a transaction, the present innovation can also be applicable as it is to various types of servers such as authenticating servers, load dispersing servers, and database servers.

The invention claimed is:

1. A computer implemented method for monitoring a server, comprising the steps of:
    acquiring a first log containing resource utilization data for a plurality of times and a second log containing transaction data from the server at corresponding times, and storing the first log and the second log in a storage device of the computer;

estimating resource utilization for each type of transaction on the basis of resource utilization data at the plurality of times included in the first log and information on a number of executions processed of each transaction type included in the second log by calculating an average value of resource utilization data for a fixed time period, calculating an amount of processing for each transaction type for the fixed time period from the number of executions processed of each transaction type, and estimating the resource utilization for each type of transaction by a multiple linear regression analysis of the average value of resource utilization data and the amount of processing for transaction type;

performing a statistical time-series analysis on time-series data of the number of executions for each transaction type included in the second log by identifying a plurality of time series models for each transaction type using the time-series data of the number of executions for each transaction type, comparing each time-series model of the plurality of time-series models for each transaction type to the time-series data of the number of executions for each transaction type to determine an error for each time-series model, selecting a time-series model for each transaction type from the plurality of time-series models for each transaction type which has the smallest error and predicting a future amount of executions for each transaction type using the selected time-series model for each transaction type; and predicting server resource demand on the basis of the resource utilization for each type of transaction estimated by the estimating step and the future amount of executions for each transaction type predicted by the predicting step by summing products of the resource utilization for each type of transaction and the future amount of executions for each transaction type.

2. The computer implemented method according to claim 1, wherein the performing step comprises:

excluding a part of the time-series data and identifying the plurality of time-series models for each transaction type on the basis of remaining data;

predicting the number of a future amount of executions for each transaction type corresponding to the excluded part of the time-series data by each of the plurality of time-series models; and comparing a result of the prediction with actual data of the excluded part to determine an error for each time-series model.

3. The computer implemented method according to claim 1, wherein said resource comprises one of a CPU (central processing unit) utilization, a memory usage, a storage capacity of a storage device, and a network usage.

* * * * *